Patented Oct. 18, 1949

2,485,121

UNITED STATES PATENT OFFICE 2,485,121

1-AMINO-4-(NITRO-2'-HYDROXY)-ANILINO-ANTHRAQUINONE - 2 - SULFONIC ACIDS, THE SALTS THEREOF AND THEIR CHROME DERIVATIVES

Charlotte G. Verdery, Phillipsburg, and Curt G. Vogt, Union, N. J., assignors to General Aniline & Film Corporation, New York, N. Y., a corporation of Delaware No Drawing. Application September 6, 1946, Serial No. 695,284

4 Claims. (Cl. 260—373)

The present invention relates to vat dyestuffs of the 1-amino-4-arylamino-2-anthraquinone sulfonic acid series and more particularly to vat dyes within this group which are capable of being chromed and which are 1-amino-4-(nitro-2'-hydroxy)-anilino anthraquinone-2-sulfonic acids and their salts.

Vat dyes of the 1-amino-4-arylamino-2-anthraquinone sulfonic acid series are well known in the art. Difficulties, however, have been experienced with the known dyes, particularly when employing the same to dye wool from neutral solutions. In addition, the known dyes generally yield from neutral or acid baths dyeings which are either blue or a bluish green in shade. Various attempts have been made to improve the properties of such dyestuffs by incorporating substituents in both the arylamino group in four position and in the anthraquinone ring itself. For instance, in U. S. P. 2,170,385 it is stated that by the introduction of a nitro group in 5-position the dyestuffs dye wool more satisfactorily from a neutral source. However, the dyeings obtained from these products, as stated in the patent, are either blue or bluish green in shade.

It has now been discovered that if the arylamino group in this class of dyes be the radical of a nitrated ortho-aminophenol, the products obtained give dyeings of an improved shade and readily dye wool from either neutral or acid solutions. In addition, they are capable of being chromed either in substance or on the fiber to yield dyeings which are dark green, olive or black in shade.

It is accordingly an object of the present invention to produce a new class of 1-amino-4-arylamino-2-anthraquinone sulfonic acids.

It is a further object to produce a class of 1-amino-4-arylamino-2-anthraquinone sulfonic acids wherein the arylamino radical is a nitrated ortho-aminophenol.

It is a further object of the present invention to produce dyestuffs which are 1-amino-4-(nitro-2'-hydroxy) - anilino - anthraquinone-2-sulfonic acids which readily dye wool from neutral solutions yielding dyestuffs of improved green shades.

A further object of this invention are 1-amino-4-(nitro-2'-hydroxy)-anilino anthraquinone-2-sulfonic acids which have been chromed and are capable of yielding dyeings of a shade which may be dark green, olive green or black.

Other and further important objects of the invention will be apparent as the description proceeds.

The dyestuffs which are contemplated by the present invention and which may be subjected to a chroming process possess the following structural formula:

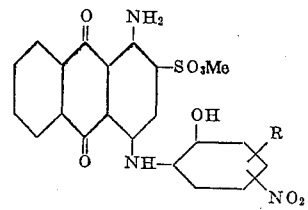

wherein Me is hydrogen, ammonium or an alkali metal, R is hydrogen, sulfo, carboxy, alkyl, such as methyl, ethyl, butyl, lauryl, octadecyl and the like, halogen such as bromine, chlorine and the like, hydroxy, nitro, amino, acylamino such as acetylamino, propionylamino and the like.

These products are obtained by condensing a 1-amino-4-halogen anthraquinone - 2 - sulfonic acid or a salt thereof, for instance, 1-amino-4-bromo-anthraquinone-2-sulfonic acid with the desired nitrated ortho-amino-phenol. The nitrated ortho-aminophenols which may be employed have the following structural formula:

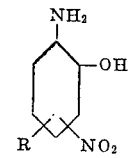

in which R has the values given above. Examples of such nitrated ortho-aminophenols are 3-amino-2-hydroxy-5-nitrobenzene sulfonic acid, 6-amino-4-nitro-2-cresol, 2-amino-4-chloro-6-nitrophenol, 4-hydroxy-5-nitrometanilic acid, 4-nitro-2-aminophenol, 5 - nitro - 2 - aminophenol, 4,6-dinitro-2-aminophenol, 4-nitro-2,6-diaminophenol, 4-nitro-2-amino-6-acetaminophenol, 6-amino-m-cresol, 4-nitro-2-amino-resorcinol, 2-amino-5-nitro-4-propylphenol, 5-nitro-2-amino-p-cresol, 2-amino-4-chloro-5-nitrophenol and the like.

The condensation yielding the desired dyestuffs is effected by heating the reactants in aqueous solution with copper or a copper salt such as cuprous chloride and an acid-binding agent such as sodium or potassium bicarbonate. In order to insure a product of high purity, it is recommended that the reaction be effected while excluding air from the hot reaction mixture. This result may be achieved, for instance, by working in an inert atmosphere supplied by nitrogen, carbon dioxide or the like. The products contemplated by the present invention prior to chroming possess the peculiar characteristic attributable to the presence of the nitro group in the anilino radical of dyeing wool in much greener shades than is possible with corresponding compounds which do not contain the nitro substituent. The products which do not have the nitro group in the anilino radical dye wool blue in color. If the nitro group be present in the anthraquinone ring as in the aforementioned Patent 2,170,385, then wool is dyed in shades of blue to blue-green by such products.

The dyestuffs described herein by monochroming yield dyestuffs which are olive green in color. By after-chroming, the dyeings obtained with such dyestuffs are black in color. The dyeings obtained with either the chromed or unchromed product are of good fastness to light and crocking.

The following examples, in which parts are by weight, serve to illustrate the invention, but it is to be understood that these are exemplary and not limitative:

*Example I*

A mixture of 300 parts of water, 38.4 parts of 1-amino-4-bromoanthraquinone-2-sulfonic acid, 25.2 parts of sodium bicarbonate, 3 parts of cuprous bromide, 5 parts of sodium sulfite and 28 parts of the sodium salt of 6-nitro-2-aminophenol-4-sulfonic acid was refluxed under an atmosphere of nitrogen for 5 hours. The hot solution was filtered, the filtrate cooled and made strongly acid with hydrochloric acid. The precipitated dyestuff was recovered by filtration and washed with 6 N. hydrochloric acid until a clear filtrate was obtained.

The product dyes wool green from a neutral bath and blue from an acid bath. The dyestuff changes to an olive color by monochrome treatment and black in after-chrome. The dyestuff has good fastness to light and crocking.

*Example II*

A mixture of 250 parts of water, 38.4 parts of 1-amino-4-bromoanthraquinone-2-sulfonic acid, 3 parts cuprous bromide, 25.2 parts sodium bicarbonate, 5 parts sodium sulfite and 28 parts of the sodium salt of 4-nitro-2-aminophenol-6-sulfonic acid was refluxed under an atmosphere of nitrogen for 6 hours. During the cooling of the reaction mixture, the product precipitated. The dyestuff was filtered off and washed with 6 N. hydrochloric acid until a clear filtrate was obtained.

Dyeings of this product on wool are bright green from a neutral bath and greenish blue from acid. The monochrome and after-chrome dyeings give olive green shades. The dyestuff has good fastness properties, especially to light and crocking.

*Example III*

A mixture of 300 parts of water, 25.2 parts of sodium bicarbonate, 5 parts of sodium sulfite, 3 parts of cuprous bromide, 22.5 parts of 4-chloro-6-nitro-2-aminophenol and 38.4 parts of 1-amino-4-bromoanthraquinone-2-sulfonic acid was refluxed for five hours under an atmosphere of nitrogen. The reaction mixture was cooled and the dyestuff was recovered by filtration. The filter cake was washed with 6 N. hydrochloric acid until a clear filtrate was obtained. The solid was then sludged with 100 parts of concentrated ammonium hydroxide and evaporated to dryness.

The dyestuff obtained dyes wool greenish gray from a neutral bath and dark blue from acid. The dyeings from monochrome are olive and gray from after-chrome. The fastness properties are good, especially to light and crocking.

*Example IV*

A mixture of 140 parts of water, 10 parts of 1-amino-4-bromoanthraquinone-2-sulfonic acid, 2.5 parts of sodium bicarbonate, 2.5 parts of sodium sulfite, 1 part of cuprous bromide and 5.2 parts of 2-amino-4-nitro-6-methylphenol was heated at 90–95° C. for six hours under an atmosphere of nitrogen. The reaction mixture was cooled and the precipitated product filtered off. The crude dyestuff was purified by washing with 6 N. HCl until a colorless filtrate was obtained.

The product dyes wool green from a neutral bath and blue from acid. The metallized dyeings are olive from monochrome and after-chrome.

We claim:

1. Vat dyestuffs selected from the class consisting of those of the following formula:

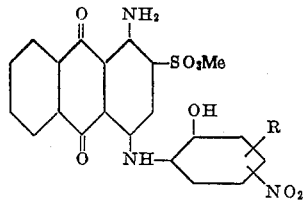

in which Me is a member selected from the class consisting of hydrogen, ammonium and an alkali metal, and R is selected from the class consisting of hydrogen, sulfo, alkyl, halogen, hydroxy, nitro, amino and acetylamino and the chrome derivatives thereof.

2. A vat dyestuff having the following constitution:

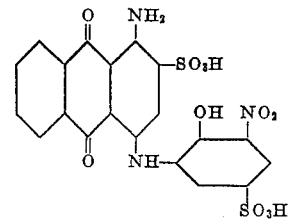

3. A vat dyestuff having the following constitution:

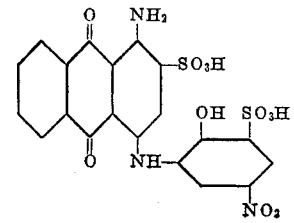

4. A vat dyestuff having the following constitution:
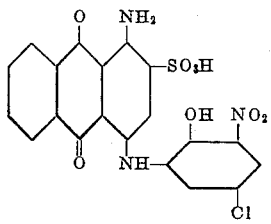
CHARLOTTE G. VERDERY.
CURT G. VOGT.
REFERENCES CITED
The following references are of record in the file of this patent:
UNITED STATES PATENTS
| Number | Name | Date |
|---|---|---|
| 1,848,509 | Weinand | Mar. 8, 1932 |
FOREIGN PATENTS
| Number | Country | Date |
|---|---|---|
| 419,990 | Great Britain | Nov. 22, 1934 |
| 624,581 | Germany | Jan. 24, 1936 |